(12) United States Patent
Drane et al.

(10) Patent No.: US 9,530,331 B2
(45) Date of Patent: Dec. 27, 2016

(54) SYSTEM AND METHOD FOR SELECTING AND ALTERING A TRAINING SESSION

(71) Applicant: Axeos, LLC, Austin, TX (US)

(72) Inventors: Douglas Drane, Austin, TX (US); Eileen McDonald, Austin, TX (US); Pilar Angel, Austin, TX (US)

(73) Assignee: Axeos, LLC, Austin, TX (US)

( * ) Notice: Subject to any disclaimer, the term of this patent is extended or adjusted under 35 U.S.C. 154(b) by 123 days.

(21) Appl. No.: 13/646,372

(22) Filed: Oct. 5, 2012

(65) Prior Publication Data

US 2013/0089840 A1 Apr. 11, 2013

Related U.S. Application Data

(60) Provisional application No. 61/544,989, filed on Oct. 7, 2011.

(51) Int. Cl.
*G09B 19/00* (2006.01)
*G09B 5/06* (2006.01)

(52) U.S. Cl.
CPC ............ *G09B 19/00* (2013.01); *G09B 5/06* (2013.01); *G09B 19/0038* (2013.01)

(58) Field of Classification Search
CPC ..................................................... G09B 19/00
USPC ........................................................... 434/219
See application file for complete search history.

(56) References Cited

U.S. PATENT DOCUMENTS 5,724,987 A * 3/1998 Gevins et al. ................ 600/544
2006/0234201 A1 * 10/2006 Pierson et al. ............... 434/323

OTHER PUBLICATIONS

MacDermid, et al., 'Developing Biologically-Based Assessment Tools for Physical Therapy Management of Neck Pain'; Journal of Orthopaedic & Sports Physical Therapy, vol. 39, No. 5, May 2009; pp. 388-399.*

* cited by examiner

*Primary Examiner* — Robert P Bullington
(74) *Attorney, Agent, or Firm* — McGuireWoods LLP

(57) ABSTRACT

The disclosed embodiments include a system and method for improving corporate employee work performance. The disclosed embodiments provide an innovative approach to optimizing the talent and resources within an organization including, but not limited to, an individual employee, teams of employees, and to executives within the organization. Through the application of a multivariate model based on physiological, affective, and behavioral systems, the disclosed embodiments attempt to improve an employee's vitality, vibrancy, wellness, and overall work performance.

19 Claims, 10 Drawing Sheets

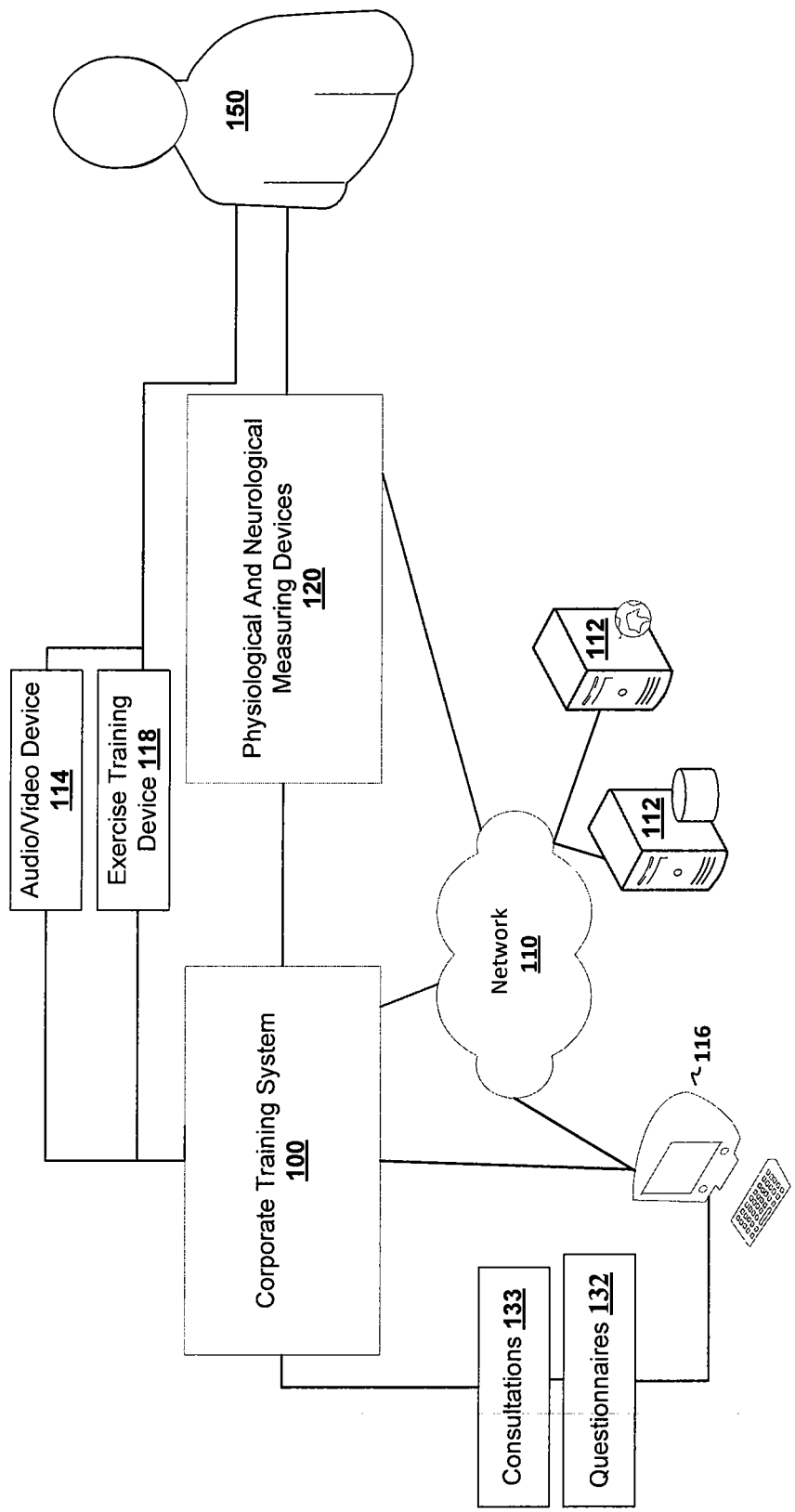

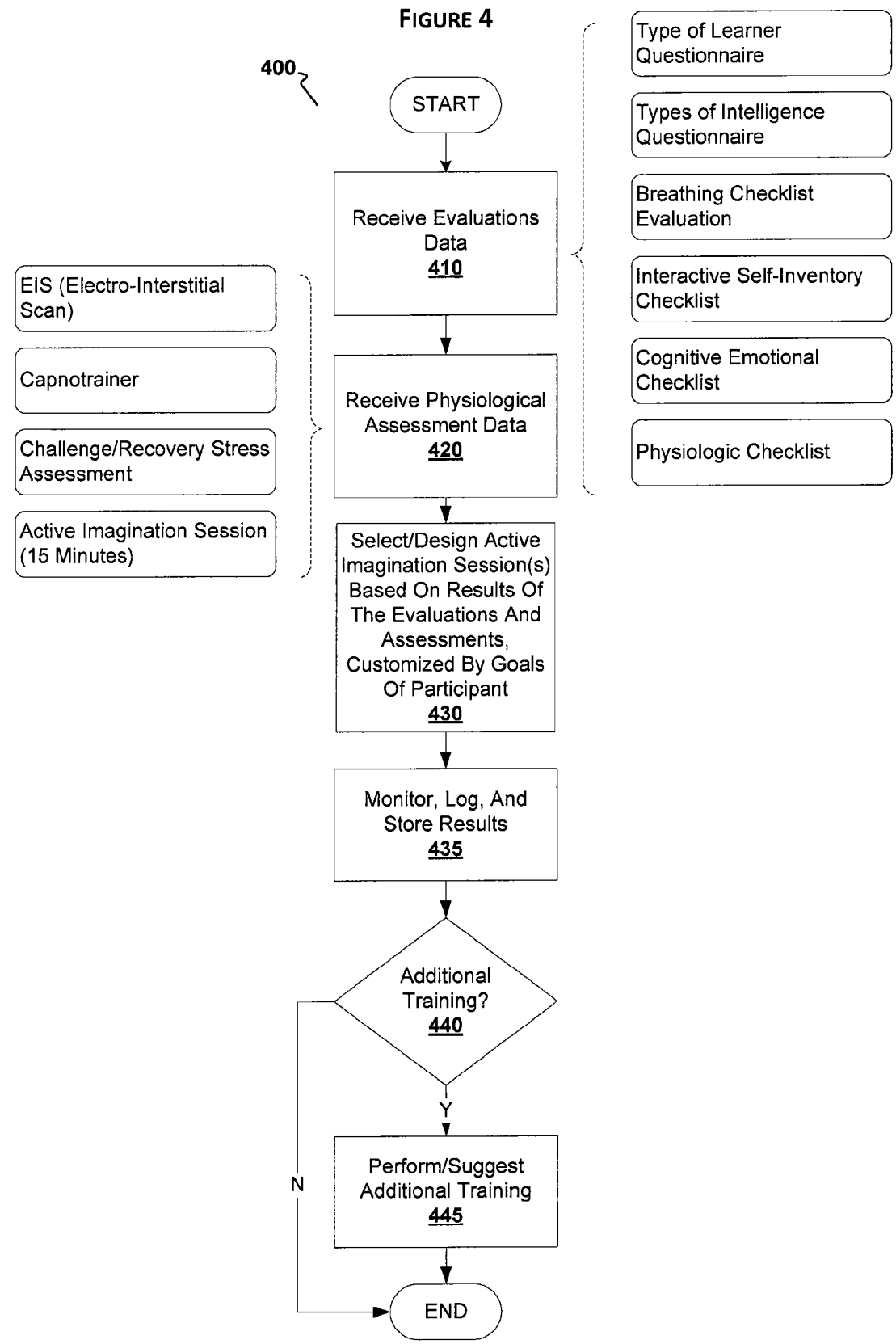

LEARNING STYLE ASSESSMENT QUESTIONNAIRE

Name:
Date:
Please circle all the statements that are true for you.

Visual Preference
- I speak quickly
- I am a good long-range planner and organizer
- I am an observant of environmental detail
- I am appearance-oriented in both dress and presentation
- I am a good speller who can actually see the words in my mind
- I am able to remember what was seen, rather than heard
- I am able to memorize by visual association
- I am usually not distracted by noise
- I have trouble remembering verbal instructions unless they are written down and often ask people to repeat themselves
- I am a strong and a fast reader
- I would rather read than be read to
- I doodle during phone conversations and staff meetings
- I forget to relay verbal messages to others
- I would rather do a demonstration than make a speech
- I often know what to say but can't think of the right words

Auditory Preference
- I talk to myself while working
- I am easily distracted by noise
- I move my lips and pronounce the words as I read
- I enjoy reading aloud and listening
- I can repeat back and mimic tone pitch and timbre
- I find writing difficult, but am better at telling
- I speak in rhythmic patterns
- I am frequently an eloquent speaker
- I learn by listening, and remember what was discussed rather than seen
- I can spell better out loud than in writing

Kinesthetic Preference
- I speak slowly
- I respond to physical rewards
- I touch people to get their attention
- I stand close when talking to someone
- I am physically oriented and move a lot
- I have early large-muscle development
- I learn by manipulating and doing
- I memorize by walking and seeing
- I use a finger as a pointer when reading
- I gesture a lot
- I can't sit still for long periods of time
- I use action words
- I like plot-oriented books - I reflect action with body movement as I read
- I may have messy handwriting
- I want to act things out

INTELLIGENCE QUESTIONNAIRE

Name:
Date:
*On a scale from 0 to 5, 0 being the least and 5 being the maximum, please rate the following as to what you identify with.*

Linguistic and Verbal Intelligence: A person strong in this area is good with words. They are often good at writing, reading, and talking about things. This group often includes writers, poets, lawyers and public speakers. _____

Logical and Mathematical Intelligence: A person strong in this area is good with math and logic problems. They often enjoy solving mysteries, reading about scientific discoveries, and like to figure out how things work. They are also usually good with computers and a variety of other gadgets. _____

Spatial Intelligence: A person strong in this area is good with pictures and images. They are often good at putting puzzles together. They appreciate art and photography, like to draw or doodle, notice details, prefer geometry over algebra, and are good at directions.

_____

Body and Movement Intelligence: A person strong in this area is good with sports and movement. They often talk with their hands, like to build things, clown around in class, have great balance, and are good at a variety of sports. _____

Musical Intelligence: A person strong in this area is good with music and rhythm. They can often read music, remember old songs, notice patterns, and can naturally figure out how to play a tune on an instrument. _____

Interpersonal Intelligence: A person strong in this area is good with people. They are good listeners, can read body language, hate injustice, can see through people who aren't being honest, hurt when others hurt, enjoy deep conversations, and often reach out to others who are hurting. Educators, counselors, salespeople, religious and political leaders all need a well-developed interpersonal intelligence. _____

Intrapersonal Intelligence: A person strong in this area is good at analyzing things. They often think a lot and are highly aware of their strengths and weaknesses. They also often keep a journal and think deeply about life. _____

Naturalist Intelligence: A person strong in this area is good at understanding nature. They enjoy the wilderness and like to read about nature. They also categorize things, collect things, and enjoy studying plant parts. _____

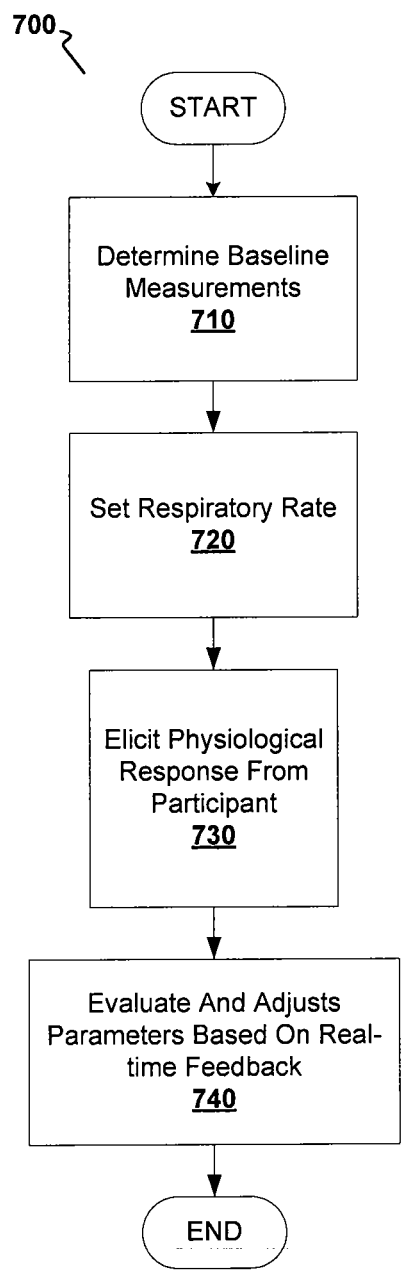

SYSTEM AND METHOD FOR SELECTING AND ALTERING A TRAINING SESSION

CROSS REFERENCE TO RELATED APPLICATIONS

This application claims the benefit of U.S. Provisional Applications No. 61/544,999, 61/544,989; and 61/544,975, filed on Oct. 7, 2011, this in the name of inventors Douglas Drane, Eileen McDonald, and Pilar Angel, which is hereby incorporated by reference.

BACKGROUND OF THE INVENTION

Employee inefficiency in the business world cost corporations billions of dollars each year. Factors that may contribute to employee inefficiency include lack of motivation, enthusiasm, attention, creativity, flexibility/adaptability, sleep deprivation, boredom, and the inability to handle stress efficiently. Whether an employee is underperforming, performing normally, and/or performing at an exceptional level, every corporation can benefit from training employees to better handle any of the above factors in order to improve employee efficiency.

SUMMARY OF THE INVENTION

The disclosed embodiments include a system and method for improving corporate employee efficiency. The disclosed embodiments provide an innovative approach to optimizing the talent and resources within an organization including, but not limited to, an individual employee, teams of employees, and to executives within the organization. Through the application of a multivariate model based on physiological, affective, and behavioral systems, the disclosed embodiments are capable of improving an employee's vitality, vibrancy, wellness and overall work performance.

As an example, in certain embodiments, the system uses real-time physiological measurements to identify how the body functions while it performs daily activities and challenges. The system allows individuals to become aware of actions and behaviors that limit peak performance. This multivariate performance optimization model gathers high quality information by using multiple feedback loops in parallel to give individuals the chance to change those actions and remove the obstacles, resulting in optimal performance that will ultimately impact and benefit a company as a whole.

For instance, in one embodiment, a method for improving work-related performance of a participant is disclosed that includes obtaining real-time physiological information of the participant before and during a training session. The real-time physiological information includes information indicating how the participant physically and mentally reacts to training information during the training session. The method dynamically alters the training information presented during the training session based at least on the real-time physiological information to attain a desired result.

The disclosed system may include a data storage component for storing data and executable instructions. The system may also include a communication interface configured to receive real-time physiological information of the participant. The real-time physiological information includes information indicating how the participant physically and mentally reacts to training information during a training session that is intended to improve the participant's work-related performance. The system further includes at least one processor configured to execute the executable instructions to dynamically alter the training information during the training session based at least on the real-time physiological information to attain a desired result.

BRIEF DESCRIPTION OF THE DRAWINGS

Illustrative embodiments of the present invention are described in detail below with reference to the attached drawing figures, which are incorporated by reference herein and wherein:

FIG. 1 is a block diagram illustrating an overview of the disclosed system in accordance with the disclosed embodiments;

FIG. 4 illustrates an embodiment of a training program;

FIG. 5 illustrates an example of a learning style assessment questionnaire in accordance with the disclosed embodiments;

FIG. 6 illustrates an example of an intelligence questionnaire in accordance with the disclosed embodiments;

FIG. 7 illustrates an embodiment of a respiratory fitness training session;

DETAILED DESCRIPTION OF THE DRAWINGS

The disclosed embodiments and advantages thereof are best understood by referring to FIGS. 1-9 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Beginning with FIG. 1, a block diagram illustrating an overview of a corporate training system 100 is depicted in accordance with one of the disclosed embodiments. In accordance with the disclosed embodiments, the corporate training system 100 is utilized to train corporate employees (e.g., employee 150) for improving work-related performance. The terms "employee" and "participant" as referenced herein refers to any person utilizing the disclosed embodiments for improving work performance and is not limited to any particular level or status of a person within an organization. For example, the disclosed embodiments may be utilized to improve work performance of, but not limited to, corporate executives, engineers, and staff employees. Similarly, the term corporate, as referenced herein, is not limited to any particular type or size of a business or organization. For instance, the corporate training system 100 may be utilized by a solo business owner for improving his/her own work-related performance. In addition, the term work-related performance is not limited to tasks perform only at a work location. Non-limiting examples of work-related performance includes increasing attention span, creativity, relaxation, lowering stress, improving balance and focus during multitasking or stressful situations, improving sleep quality, improving flexibility or adaptability to changing conditions, and improving memory.

In the depicted embodiment, the corporate training system 100 monitors and evaluates in real time the physiological and neurological changes of an employee during certain activities. The activities may be every day work-related activities, non-work-related activities, and/or computer generated activities. The computer generated activities may be produced to elicit, stimulate, evaluate, and/or monitor for certain reactions of a participant. For instance, the corporate training system 100 may be configured to communicate with a plurality of physiological and neurological measuring devices 120 for capturing the physiological and neurological changes of a participant during a computer generated activity designed to evaluate a participant's reaction to a stressful situation.

Figure 1A:
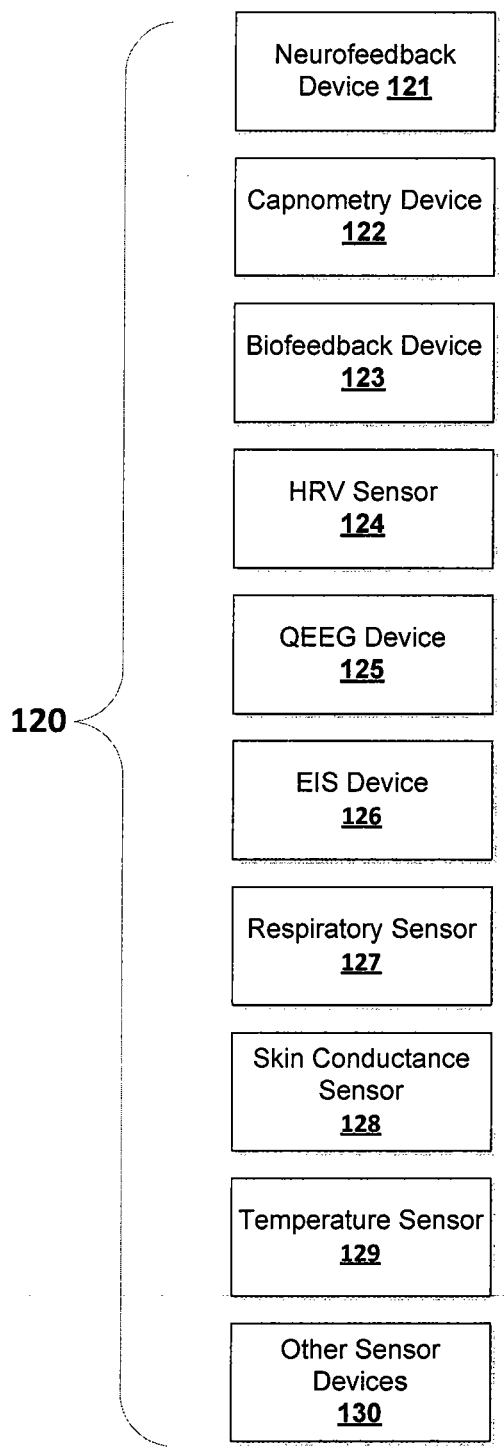
FIG. 1A illustrates examples of physiological and neurological measuring devices that may be utilized in the disclosed embodiments.

Referring to FIG. 1A, in one embodiment, the plurality of physiological and neurological measuring devices 120 may include, but not limited to, a neurofeedback device 121, a capnometer device 122, a biofeedback device 123, a heart rate variability (HRV) sensor 124, a Quantitative Electroencephalographic (QEEG) device 125, an Electro-Interstitial Scan (EIS) Device 126, a respiratory sensor 127, a skin conductance sensor 128, and a temperature sensor 129. The following is a nonlimiting description of each of the above devices:

The neurofeedback device 121 provides real-time information to the corporate training system 100 regarding the neurological physiological state/function of the employee. As an example, the neurofeedback device 121 provides information that focuses on the central nervous system and the brain. In certain embodiments, the information gathered from the neurofeedback device is used to assist in analyzing brain wave balancing, problem solving, peak performance, and attention/focus issues.

The capnometer device 122 provides real-time information regarding the quality of a participant's breathing, which is important because respiratory fitness is essential in bringing the nervous system into balance. The capnometer device 122 may be configured to measure the carbon dioxide ($CO_2$) retention in the alveoli of the lungs. Data captured by the capnometer device 122 provides information regarding how a participant breathes, how their breathing affects them, and provides information that helps a participant learn to effectively self-regulate breathing behavior.

The biofeedback device 123 monitors a participant's physical and emotional responses to stress and provides feedback that helps the participant learn how to optimally activate, balance, release and recover from stress. The biofeedback device 123 utilizes sensors (e.g., EEG, temperature probe, heart rate, myoscan, skin conductance, respiration) attached to a participant to monitor in real-time the physiological changes that occur during computer generated activities. The computer generated activities may include a plurality of active tasks and may also include one or one or more resting periods. The active tasks may evaluate a set of parameters including, but not limited to: time pressure, anticipation, competition, multitasking, startle and learning.

Once completed, the corporate training system 100 is configured to provide information on how the participant responds to the challenge such as, but not limited to, how quickly a participant recovers from a particular challenge.

The HRV sensor 124 provides for direct observation of parasympathetic nervous system activity, the subdivision of the autonomic nervous system that defines the relaxation-alertness dimension of autonomic regulation. The data gathered from the HRV sensor 124 is an important indicator of both physiological resiliency and behavioral flexibility reflecting the individual's capacity to adapt effectively to challenges.

The QEEG device 125 measures, using digital technology, electrical patterns at the surface of the scalp which primarily reflect cortical electrical activity or "brainwaves." The QEEG device 125 applies multi-channel measurements that can determine areas of brain activity and is capable of reading brain activity data from the entire head simultaneously. In one embodiment, the corporate training system 100 utilizes the results for topographic brain mapping using color maps in 2D and 3D to enhance visualization to illustrate the electrical activity of the cerebral cortex.

The EIS Device 126 monitors how the body reacts to challenges in real time (e.g., physiologic stress). The EIS Device 126 integrates neurophysiology models that describe the way the different systems regulate the human body in order to maintain it in a well balance state. Discrepancies between the expected behaviors of the different elements of the body and their actual states are revealed by the measurements. In one embodiment, the EIS Device 126 can evaluate the tissues of all organs, 69 physiological parameters, and 19 functional anatomy systems of the body and provide repeatable clinical precision accurate data with no operator bias. Through Electro Scan Gram (ESG) modeling, the EIS Device 126 develops a complete descriptive human model of the body with the organs and tissues and provides an indication to where stress is affecting the overall health.

The respiratory sensor 127 provides information for stress assessment and breathing training. An example of the respiratory sensor 127 is a respiratory girth sensor used to detect chest or abdominal expansion/contraction. The respiratory sensor 127 may provide detailed information about a person's breathing including providing the respiration waveform and amplitude. The respiratory sensor 127 may be worn over or under a person's clothing.

The skin conductance sensor 128 measures the electrical conductance across the skin, which may vary based on the skin's moisture level. The skin's moisture is produced by sweat glands that are controlled by the sympathetic nervous system, so skin conductance is used as an indication of psychological or physiological arousal. The skin conductance sensor 128 may be connected to a participant's finger (s) or any other portion of a participant for measuring electrical conductance across the skin. The corporate training system 100 uses the information gather from the skin conductance sensor 128 for stress assessment and biofeedback.

In addition, a temperature sensor 129 may be utilized to provide skin surface temperature. The temperature sensor 129 is operable to measure skin temperature between 10° C.-45° C. (50° F.-115° F.). The corporate training system 100 uses the information gather from the temperature sensor 129, along with other measurements, for stress assessment and biofeedback.

Although the above devices and sensors have been described as separate devices, one or more of the above devices and sensors may be incorporated into a single device/sensor. For example, the skin conductance sensor 128 and the temperature sensor 129 may both be incorporated into a single device that is attached to a participant's finger. In addition, one or more of the above described devices may be modified or combined to provide additional information and/or information in lieu of that described above. Further, the corporate training system 100 may communicate with other sensors or monitoring devices 130 not depicted in FIG. 1A.

Still, the corporate training system 100 may communicate and/or control other devices including, but not limited to, an audio/video device 114, a computer 116, and an exercise training device 118. For instance, the corporate training system 100 may control, communicate, or utilize an audio and/or video device to present training information that includes audio-visual information to the participant such as, but not limited to, active imagination sessions as will described in further detail below.

Additionally, in certain embodiments, in addition to receiving physiological and neurological data from the plurality of physiological and neurological measuring devices 120, the corporate training system 100 may receive additional information about a participant through the use of questionnaires 132 and/or through consultations 133 with a participant. In one embodiment, the information from questionnaires 132 or consultations 133 may be entered directly into the corporate training system 100. In other embodiments, the corporate training system may communicate with one or more local or remote devices for retrieving the information from questionnaires 132 or consultations 133. For example, a participant may provide information to one or more servers 112 through a Web portal. The corporate training system 100 may be configured to communicate with the servers 112 over a communication network 110, such as, but not limited to, the Internet, for retrieving the participants' information.

Figure 2:
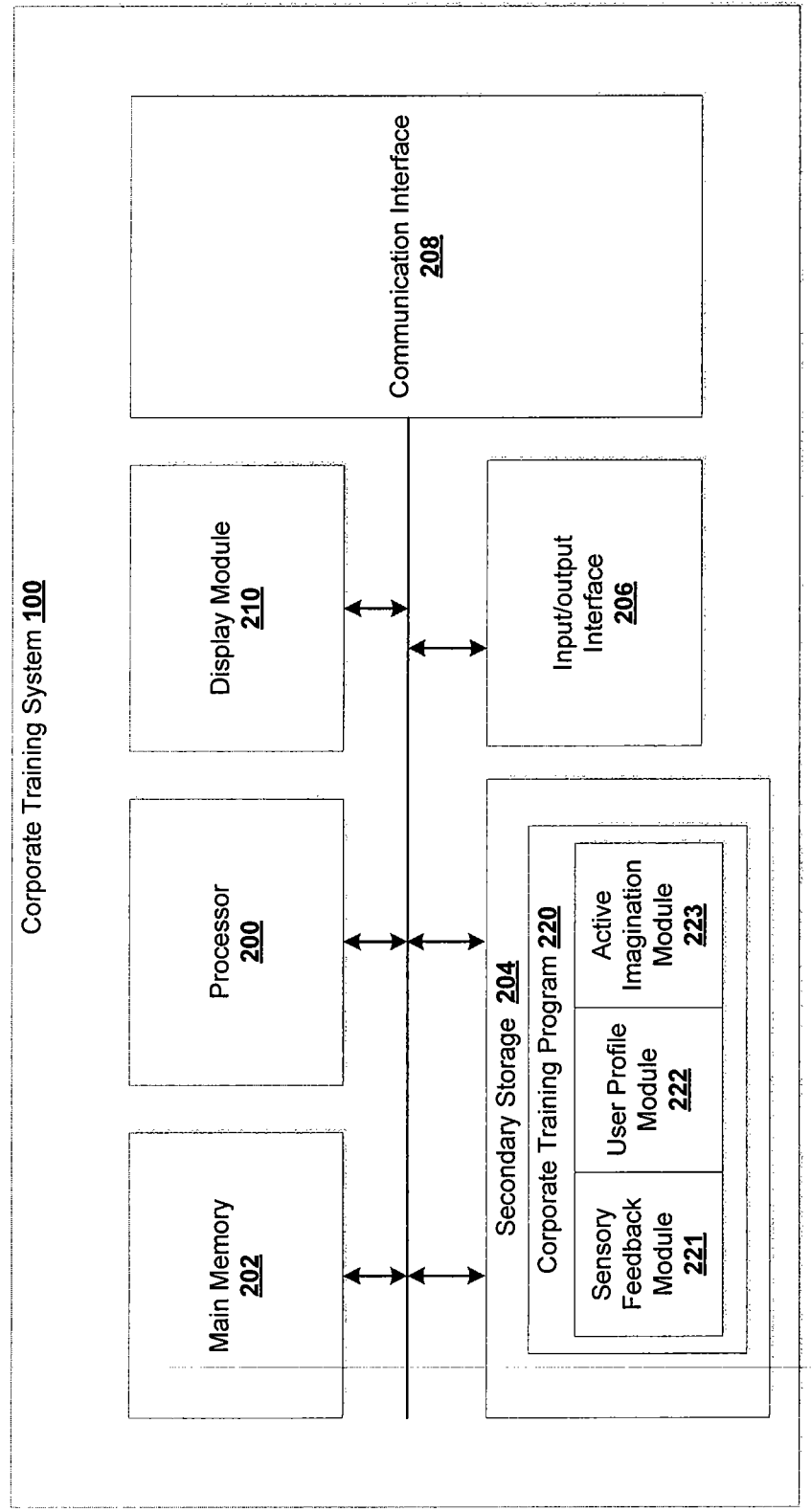
FIG. 2 is a block diagram illustrating the architecture of a system in accordance with one of the disclosed embodiments.

FIG. 2 is a block diagram illustrating exemplary components of the corporate training system 100 in accordance with one of the embodiments. In the illustrated embodiment, the corporate training system 100 includes a processor 200, main memory 202, secondary storage unit 204, an input/output interface module 206, a communication interface module 208, and a display module 210. The processor 200 may be any type of processor capable of executing instructions for performing functions associated with the corporate training system 100. Main memory 202 is volatile memory that stores currently executing instructions/data and instructions/data that are prefetched for execution. The secondary storage unit 204 is non-volatile memory for storing persistent data. The secondary storage unit 204 may be or include any type of data storage component such as a hard drive, a flash drive, or a memory card.

The input/output interface module 206 enables the corporate training system 100 to receive user input and provide output information to a user or other devices. For example, the input/output interface module 206 may include a keyboard interface for receiving keyboard inputs from a user. The input/output interface module 206 may also include a mouse/trackball interface for enabling a user to position a pointer on a user interface for selecting or entering data. In some embodiments, the input/output interface module 206 also provides audio and video capabilities. For instance, the input/output interface module 206 may interface with an internal or external camera for providing video capturing. The input/output interface module 206 may also enable external devices such as printers, USB flash drive, speakers, to be connected to the corporate training system 100.

The corporate training system 100 may also utilize a communication interface module 208 to communicate with other devices/sensors as illustrated in FIG. 1 and/or other devices over a network. For instance, in certain embodiments, the communication interface module 208 enables the corporate training system 100 to communicate with other devices over a wired or wireless network (e.g., WiFi, Bluetooth, Near Field Communication/Radio-Frequency Identification (NFC/RFID), etc.) The network may be a local network or any other type of communication network such as, but not limited to, the Internet.

The display module 210 enables information to be displayed on an internal or external display device. In some embodiments, the display module 210 may include instructions or hardware for providing touchscreen capabilities for receiving user input via the display device. In certain embodiments, the display module 210 may also enable multi-touch functionalities associated with the display device.

In accordance with the disclosed embodiments, the corporate training system 100 stores data and instructions for executing a Corporate Training Program 220 for improving workplace performance of a corporate employee. The corporate training program 220 includes software modules having instructions that are configured to provide one or more training programs for improving a participant work-related performance. An example of the types of software modules that may be included in the Corporate Training Program 220 includes a sensory feedback module 221, a user profile module 222, and an active imagination module 223.

The sensory feedback module 221 may contain algorithms for analyzing information received from the one or more sensory devices associated with a participant. For example, the sensory feedback module 221 may compare the brainwave results gathered from the QEEG device 125 to a normative database (Neuroguide) in evaluating a participant's mental state.

The user profile module 222 may include instructions for gathering profile information about a user (e.g., from questionnaires, a consultation, etc.). For example, user profile module 222 may include instructions for communicating with a remote server or database retrieving the user profile information. The user profile module 222 may also include instructions for utilizing the user's profile information along with sensory feedback information for evaluating a user's condition and for recommending a particular training program, training session, and/or training information. For instance, in one embodiment, based on the analysis of the user input information (such as, but not limited to, a participant's goal) and real-time physiological information that indicates a user's stress levels, the corporate training system 100 may automatically select a training program for improving a particular aspect or aspects related to a participant's work-related performance.

In accordance with the disclosed embodiments, an employee training program may include one or more active imagination sessions. An active imagination (AI) session involves a relaxation/meditation technique wherein the contents of one's unconscious are translated into images or narrative in the form of a story/training script. During the active imagination session, the corporate training system 100 is configured to enable a participant to transform, alter, and control his/her body and his/her state of consciousness through relaxation and mental training. The conscious mind is awake and participating in the events associated with the script during the active imagination session. The story/ training script may enable the participant to live out parts of him/herself that cannot be lived fully in the daily, immediate physical world.

The active imagination module 223 of the Corporate Training Program 220 may include instructions for automatically or manually selecting an active imagination (AI) session based on the analysis of a participants' user profile information. For example, the active imagination session may include, select, and/or generate custom audio tracks and/or videos that are personally designed for each participant based on their assessment results. As an example, based on a participant's preliminary assessment, the Active Imagination Module 223 may select an audio track of Tibetan Bells to enhance coherent breathing to balance the central nervous system. In some embodiments, the preliminary assessment may also be based on receiving user input regarding the participant's profile (e.g., physical profile: age, weight, height, etc.) and/or information regarding a participant's goals. Examples of goals may include, but are not limited to, increase attention span, improve creativity or memory functions, improve stress management, and improve sleep. The user input may also be from evaluations of a participant, consultations with the participant and/or from questionnaires answered by the participant. For instance, the evaluations/questionnaires may help determine how the participant best learns, his/her intelligence aptitude, and how the participant perceives him/herself.

Additionally, in certain embodiments, the Active Imagination Module 223 may receive real-time neurofeedback results and/or other physiological metrics from the plurality of physiological and neurological measuring devices 120 during an Active Imagination session. Utilizing the real-time metrics, the Active Imagination Module 223 dynamically selects a new active imagination session and/or modifies a current active imagination session including, but not limited to, altering the type of information being presented to the participant. For instance, during the Active Imagination session, participants may be attached to the QEEG device 125 to monitor brainwave changes to identify different states of awareness. The different types of brainwaves include delta, theta, alpha and beta waves, each of which occurs at various frequencies. The presence of alpha waves are an indication of an "idle state" or "ready, but not doing much" state. If alpha waves are present at a fairly high amplitude when a person is awake, this would usually indicate an inattentive, daydream state as is often seen in adolescents and adults having attention difficulties. Alpha waves disappear when the mind becomes mentally busy (e.g., open the eyes, start doing intense mental work even with eyes closed). In its place are smaller, quicker "beta" waves, which indicate that the mind is mentally busy.

Based on the analysis of the data received from the QEEG device 125, the Active Imagination Module 223 is able to determine if the participant is under-engaged, engaged, or overwhelmed during the Active Imagination session. The Active Imagination Module 223 is configured to be able to adjust the type of information (e.g., altering a story/training script) being presented to the participant to achieve a balance or desired ratio between the different types of wave pattern. For instance, in certain embodiments, the Active Imagination Module 223 may be configured with a decision tree (algorithm) that weighs certain physiological conditions higher than other physiological conditions. This weighting factor may be user selected or dynamically selected based on a participants goals and/or based on any other factor. Thus, the Corporate Training Program 220 is configured to provide each participant with real-time customized training based on his/her on goals and current state. By performing the Active Imagination sessions, the Corporate Training Program 220 is configured to train a participant to best achieve and maintain a desired mental level to achieve their desired goal.

In certain embodiments, the real-time physiological information of the participant is gathered before, during, and/or after the active imagination training session. For example, in some embodiments, an EIS measurement will be taken prior to the Active Imagination session and repeated directly after the Active Imagination session to evaluate changes that occurred in the participant's physiology during the Active Imagination session. As stated above, the real-time physiological information is received from one or more of the plurality of physiological and neurological measuring devices 120. In some embodiments, the corporate training system 100 may be configured to combine information from multiple devices, such as, but not limited to, the EIS Device 126 and the QEEG device 125, to generate information about a single physiological condition.

Figure 3:
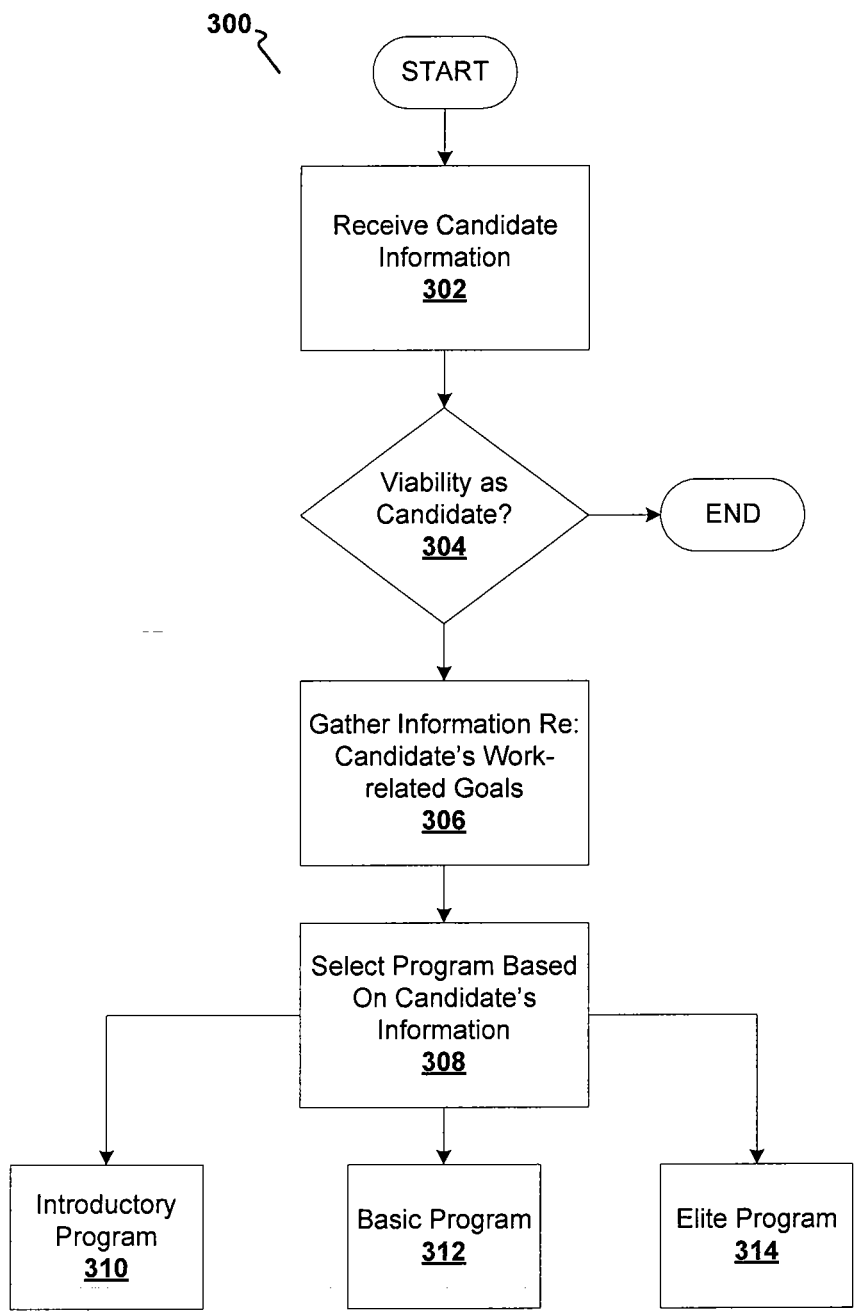
FIG. 3 is a flowchart illustrating a method for selecting one of a plurality of training programs for a participant in accordance with one embodiment.

Referring now to FIG. 3, a flowchart illustrating a method 300 is presented for selecting one of a plurality of training programs for a participant in accordance with one of the embodiments. The process starts by receiving candidate information about a participant at step 302. The candidate information may include a user profile. The user profile information may include, but is not limited to, age, weight, height, fears, health issues, medication, and any psychological and/or neurological history associated with the participant. As previously stated, the user profile information may be directly entered into the corporate training system 100 and/or may be retrieved from one or more remote devices.

At step 304, the process determines whether the candidate is a viable participant for a training program based on the user profile information. For example, if the user profile indicates that the candidate has past psychological and/or neurological issues that would affect training, the process may determine that the candidate is not suitable for the training program, in which case, the process terminates. As another example, the process may terminate based on a determination that the candidate is not a viable because the candidate is not susceptible to subconscious and/or conscious training.

If the process determines that the candidate is a viable participant for at least one training program, the process at step 306 proceeds to gathering information about a participant's work-related goals. The types of risk related goals may include, but not limited to, increasing attention, performance, flexibility and adaptability, creativity, memory, controlling stress, improving sleep, and improving motivation/drive.

Based on the gathered user profile information and the participant's goals, the process at step 308 selects one of a plurality of training programs for the participant. In one embodiment, the plurality of training programs includes an introductory program 308, a basic program 310, and an elite program 312. For example, if the candidate information identifies the candidate as someone who is overachieving in the workplace, the process may proceed to introductory program 308. If the process identifies the candidate as normal based on the candidate information, the process may proceed to the basic program 310, and if the process identifies the candidate as needing additional training beyond normal, the process may proceed to the elite program 312.

FIG. 4 illustrates an embodiment of a training program. At initial step 410, the corporate training system 100 receives a participant's evaluation data. For instance, a participant may complete one or more evaluation questionnaires. As an example, a participant may complete a learner questionnaire that used to gather information to assess and determine which type of learning style is best suited for the particular participant. An example of a learning style assessment questionnaire 500 is illustrated in FIG. 5. Learning styles refer to variations in the participant's ability to accumulate and assimilate information. For instance, a determination may be made that the participant learns best by hearing, seeing, touching/kinesthetic, use of repetition and/or analogies, reading/writing-preferences, etc. Based on the identified learning style, the corporate training system 100 is configured to adapt a learning process to fit the individual's needs.

A participant may also complete an intelligence and behavior questionnaire(s) that provides an indication of a participant's awareness of their strengths and weaknesses. The different types of intelligence include, but not limited to, linguistic and verbal, logical and mathematical, body and movement, musical, interpersonal, and naturalist. An example of an intelligence questionnaire 600 is illustrated in FIG. 6. The types of identified behavior may include independent, competitive, perfectionist, assertive, passive, impulsive, and inhibited. The results of the evaluation questionnaires are reviewed and additional information is gathered during a consultation with the participant. Data from the evaluation questionnaires and the consultation are inputted into the corporate training system 100.

At step 420, the corporate training system 100 receives physiological assessment data of the participant. In one embodiment, an electro-interstitial scan (EIS) is performed on the participant to assess where stress is located in the body, specifically within the nervous system. This information enables the corporate training system 100 to evaluate a participant's awareness of how stress affects their physiology. The corporate training system 100 is also configured to evaluate and identify discrepancies between the expected behaviors of the body, such as the anatomic nervous system, and a participant's actual state based on the results of the electro-interstitial scan and other monitoring devices to assess whether the participant is sympathetic, parasympathetic, or balance.

In addition, an initial breathing assessment is performed on the participant using a capnometer (or capnograph), which provides real-time information regarding the quality of the participant's breathing. In one embodiment, if the corporate training system 100 identifies an imbalance (e.g., a participant's $CO_2$ level is below normal range) on the initial breathing assessment, the corporate training system 100 may be configured to perform a respiratory fitness training session on the participant, as illustrated in FIG. 7 and described below.

If the corporate training system 100 determines that a participant does not require respiratory fitness training, the corporate training system 100 may be configured to perform a challenge/recovery stress assessment (or heart rate variability (HRV) training) on the participant to monitor in real time, using one or more sensors/devices as described above, the physiological changes that occur during computer generated activities. A computer generated activity may include a set number of active tasks and a set number of resting periods. For example, a computer generated activity may involve requiring the participant to solve a puzzle within a certain time. The corporate training system 100 specifically selects and designs a particular task or activity to monitor one or more parameters such as, but not limited to, time pressure, anticipation, competition, multitasking, startle, and learning. On completion of a particular task or activity, the corporate training system 100 evaluates a participant's physiological response to determine how a participant is able to handle situations involving the above parameters and how quickly a participant is able to recover from the situation.

Additionally, during the computer generated activities, continual breathing assessment is performed. The corporate training system 100 utilizes the breathing assessment information gathered during the computer generated activities along with breathing assessment information gathered from rest to the start of an activity, and from stop of the activity to recovery, to identify any imbalance in a participant's autonomic nervous system.

Based on the determined physiological response of the participant to the computer generated activities and the participant's profile information and goals, the corporate training system 100, at step 430, selects or designs one or more active imagination sessions for the participant for training the participant to better balance his/her physiological responses to situations involving the above parameters. In one embodiment, the active imagination session is designed or selected to enable a participant to best achieve an alpha state (i.e., when most alpha waves are present) in order for a participant to activate his/her relaxation response. As discussed above, the corporate training system 100 may monitor the participant's brain waves using the QEEG device 125 to determine different states of awareness.

As an example, one active imagination session may involve a participant examining a particular issue personal to the participant. This personal issue may be determined based on the user profile information. The participant may be given multiple paths/choices in which the participant is encouraged to explore for dealing with the issue. During the active imagination session, the participant's physiological responses are monitored by the corporate training system 100 in real time using one or more sensors/devices as described above. The corporate training system 100 is configured to dynamically select and/or modify an in-process active imagination session to enable a participant to alter his/her body and state of consciousness to better balance and control his/her physiological responses. For example, the active imagination session may include customize audio or audio/video specifically designed for the particular participant to activate a relaxation response. Additionally, the active imagination session may include alternative paths for a participant to alter a training script. The choices of alternative paths that may be presented may be based on the real-time physiological responses of the participant during the active imagination session and/or may also be based on prior paths selected by a participant.

Each of the active imagination training sessions may be the same or may be different so as to focus on one or more of the particular parameters or goals as identified above. For example, if one of the participant's goals is to be more creative, the active imagination training session may require interaction with the participant in which the participant generates a new storyline or decision path. As another example, if one of the participant goals is to be more flexible or adaptive, the active imagination session may include lots of unexpected issues and require that the participant be able to quickly adapt and make decisions.

The corporate training system is configured, at step 435, to monitor and store the history/results of the active imagination training sessions for enabling the system to continually modify and improve each subsequent active imagination training session so as to achieve the best results for each individual participant. The corporate training system 100 may also be configured to dynamically adjust the suggested number of imagination training sessions based on the real-time feedback, history, and goals of the participant. The corporate training system 100 may also be configured to provide reports of performance for benchmarking and progress tracking. A goal of the corporate training system 100 is to enable the participant to be able to maintain a balance mind and body and to be able to regulate physiology changes outside of the active imagination session for improving his every day work-related performance.

In one embodiment, the corporate training system 100 may be configured with three packaged levels of training, e.g., an introductory program, a basic program, and an elite program. The corporate training system 100 may include algorithms for initially determining which training program is best suited for a participant based on the participant's user profile information. For example, if the corporate training system 100 initially determined that the participant requires only the introductory program, then only one active imagination training session is performed. The basic program may require that the participant perform at least two active imagination training sessions, and the elite program may require that the participant perform at least five active imagination training sessions. Depending on a particular program and the results of an active imagination session, the corporate training system 100 may determine, at step 440, whether a participant should perform additional active imagination training session(s) or other types of training.

In addition, the corporate training system 100 may also provide additional suggestive training 445 that a participant may perform on his own to further improve his work-related performance. For example, the corporate training system 100 may recommend that a participant perform at home meditation or other relaxation techniques. The corporate training system 100 may also recommend that a participant utilize at home monitoring devices (e.g., a heart rate monitor) for enabling the participant to self-monitor and regulate his physiological changes during regular daily activities.

Thus, the above process describes an example embodiment of a training program that is performed by the corporate training system 100 for improving a participants' work-related performance. Although the above description describes separate ordered steps, the corporate training system 100 may be configured to perform any of the above steps in any particular order and/or combine certain steps together so as to enhance a particular training program. For instance, depending on a particular program, goal, and/or results, the corporate training system 100 may be configured to perform the heart rate variability (HRV) training and respiratory fitness training session simultaneously.

FIG. 7 illustrates an embodiment of a respiratory fitness training session. At step 710, the corporate training system 100 determines baseline measurements, using a capnometer or capnograph, from a participant during normal breathing. At step 720, the corporate training system sets a respiratory rate and directs the participant to follow the breathing pattern of a mechanical pacer to achieve the set respiratory rate. The corporate training system displays the real-time breathing data of a participant for enabling the participant to observe their breathing mechanics and breathing chemistry in real time.

At step 730, the corporate training system 100 may be configured to instruct the participant to either discuss and/or think about certain topics or issues to elicit a physiological response. In some embodiments, the corporate training system may be configured to display a story, a computer generated activity, images, video, or other types of stimuli for eliciting a physiological response from the participant. In certain embodiments, the corporate training system displays the real-time breathing data throughout the process for enabling the participant to observe changes in their physiology.

Based on the real-time feedback, the corporate training system, at step 740, evaluates and readjusts the parameters continuously to optimize and enable the participation to learn and control his/her breathing to achieve proper breathing mechanics during various situations.

Below are data tables containing reference values that may be utilized by the corporate training system 100 to assess whether the participant is sympathetic, parasympathetic, or balance based on the measurements from one or more sensors/devices.

| EIS - BRAIN MODELING | | | |
|---|---|---|---|
| BRAIN SECTION | PARASYMPA-THETIC | BALANCED | SYMPA-THETIC |
| FRONTAL (RT) | <= to −30 | −20 to +20 | >= +30 |
| FRONTAL (LT) | <= to −30 | −20 to +20 | >= +30 |
| TEMPERAL (RT) | <= to −30 | −20 to +20 | >= +30 |
| TEMPERAL (LT) | <= to −30 | −20 to +20 | >= +30 |
| AMYDALA | <= to +30 | −20 to +20 | >= +30 |
| AMYDALA | <= to +30 | −20 to +20 | >= +30 |
| HYPOTHALMUS | <= to −30 | −20 to +20 | >= +30 |

| NEUROTRANS-MITTERS: | PARASYMPA-THETIC | BALANCED | SYMPA-THETIC |
|---|---|---|---|
| SEROTOIN | <= to −30 | −20 to +20 | >= +30 |
| DOPAMINE | <= to −30 | −20 to +20 | >= +30 |
| CATECHOLAMINES | <= to −30 | −20 to +20 | >= +30 |
| ACETYCHOLINE | >= to +30 | −20 to +20 | <= to −30 |

| HORMONES: | PARASYMPA-THETIC | BALANCED | SYMPA-THETIC |
|---|---|---|---|
| CORTISOL | <= to −30 | −20 to +20 | >= +30 |
| DHEA | <= to −30 | −20 to +20 | >= to −30 |
| ADRENO-MEDULLARY | <= to −30 | −20 to +20 | >= +30 |

| ANDRENALS/KIDNEYS | PARASYMPA-THETIC | BALANCED | SYMPA-THETIC |
|---|---|---|---|
| ADRENALS | <= to −30 | −20 to +20 | >= +30 |
| KIDNEYS | <= to −30 | −20 to +20 | >= −30 |

| NEUROVEGA-TATIVE: | PARASYMPA-THETIC | BALANCED | SYMPA-THETIC |
|---|---|---|---|
| HEART | <= to −30 | −20 to +20 | >= +30 |
| LUNG | <= to −30 | −20 to +20 | >= +30 |
| STOMACH | <= to −30 | −20 to +20 | >= +30 |
| SMALL INTESTINE | <= to −30 | −20 to +20 | >= +30 |
| LARGE INTESTINE | >= to +30 | −20 to +20 | >= +30 |
| LIVER | — | −20 to +20 | >= +30 |
| KIDNEY | >= +30 | −20 to +20 | <= +30 |
| ADRENAL | — | −20 to +20 | >= +30 |

|  | PARASYMPATHETIC | BALANCED | SYMPATHETIC |
|---|---|---|---|
| Other: | | | |
| PH | >= to 7.41 | 7.35-7.40 | <= 7.34 |
| RESPIRATIONS: | | | |
| BASELINE | SHALLOW, IRREGULAR | RHYTHMIC | RAPID, IRREGULAR |
| TASK | NO CHANGE | INCREASE RESPIRATONS | RAPID, IRREGULAR |
| RECOVERY | NO CHANGE | RETURN TO BASELINE | RAPID, IRREGULAR |
| CAPNOTRAINER: | | | |
| END-TIDAL CO2: | BELOW 35 | 35-45 | below 35 |
| RATE: | <6 | 6-14 | >14 |
| HRV | HIGH | NORMAL | LOW/VERY LOW |
| POWER SPECTRUM | .15-.4 HZ | 1.0 HZ | .04-.15 HZ |

| SKIN TEMPERATURE: | PARASYMPATHETIC | BALANCED | SYMPATHETIC |
|---|---|---|---|
| BASELINE | LOW | NORMAL | NORMAL OR LOW |
| TASK | NO CHANGE | DROP OF 1 DEGREE F | DROP 1-2 DEGREE F |
| RECOVERY | NO CHANGE | RETURNS TO NORMAL | REMAINS LOW |

| SKIN CONDUCTIVITY:: | PARASYMPATHETIC | BALANCED | SYMPATHETIC |
|---|---|---|---|
| BASELINE | — | — | — |
| TASK | NO CHANGE | INCREASE 1-2 MICRO | INCREASE OVER 3 |
| RECOVERY | NO CHANGE | RETURN TO BASELINE | REMAINS HIGH |

| HEART RATE: | PARASYMPATHETIC | BALANCED | SYMPATHETIC |
|---|---|---|---|
| BASELINE | SLOWER | REGULAR | NORMAL OR LOW |
| TASK | NO CHANGE | INCREASE 10-20 BEATS/MIN | DROP 1-2 DEGREE F |
| RECOVERY | NO CHANGE | RETURN TO BL WITHIN 1 MINUTE | REMAINS LOW |

| MUSCLE TENSION: | PARASYMPATHETIC | BALANCED | SYMPATHETIC |
|---|---|---|---|
| BASELINE | — | 1.5-4. UV | above 4.0 UV |
| TASK | — | INCREASE | INCREASE |
| RECOVERY | — | RETURN TO BL | REMAINS HIGH |

In addition to training a participant to improve user-specified goals, in some embodiments, the corporate training system 100 may be configured to generate a profile for the participant that identifies and recommends particular goals or needs of the participant using the above physiological measurements and other user profile information such as behavior characteristics. For instance, based on the behavioral characteristics of the participant (e.g., disoriented, confused, poor memory, lack of focus, and passive) and the physiological measurements of the participant, the corporate training system 100 may determine that the participant fits a parasympathetic client profile indicating that the participant needs motivation, accountability, short task, short-term goals, and a precise clear plan of action. Similarly, based on the behavioral characteristics and physiological measurements, the corporate training system may determine that the participant fits a sympathetic client profile or a balance client profile. Based on the determined client profile, the corporate training system 100 is then able to dynamically design the training program (e.g., what technique or technology to use, the type of computer generated activities, type of active imagination session, the number training sessions, etc.) that best suits the participant to achieve better work-related performance.

Figure 8:
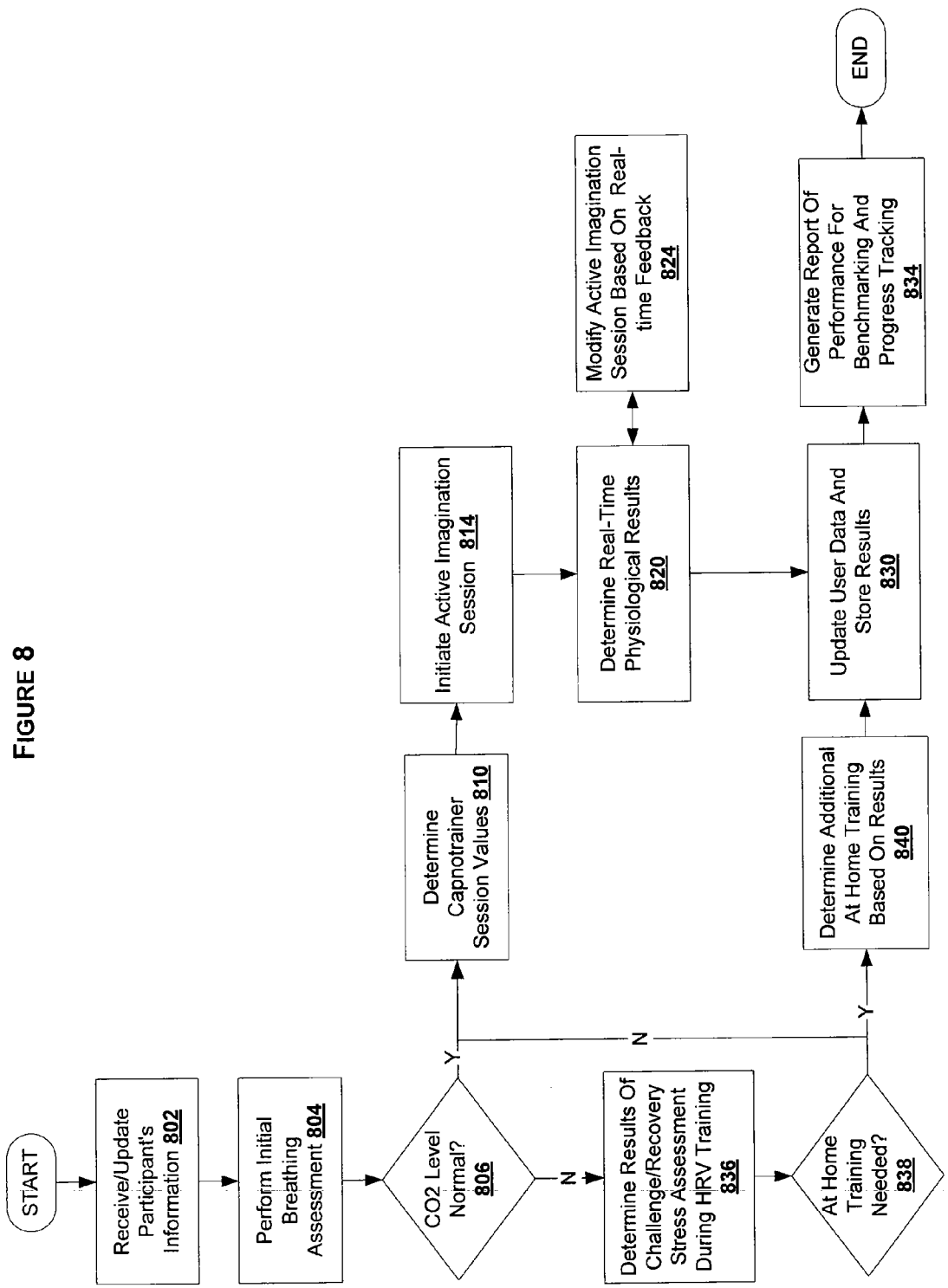
FIG. 8 illustrates a method for improving work-related performance in accordance with the disclosed embodiments.

FIG. 8 illustrates a training method 800 for improving work-related performance in accordance with the disclosed embodiments. The training method 800 begins at step 802 by receiving, loading, and/or updating a participant's information. The participant information may be new information and/or may include information from any prior training sessions. At step 804, an initial breathing assessment is performed to determine whether the participant's carbon dioxide level is normal. If the participant's carbon dioxide level is determined at step 806 to be at or above normal, the process, at step 810, performs and determines the physiological measurements values during a capnotrainer session. During the capnotrainer session, the process observes, evaluates, and learns a participant's breathing behavior. Based on the results of the capnotrainer session, the process initiates by selecting or designing an active imagination session at step 814. The process monitors the real-time physiological results including neural feedback results during the active imagination session at step 820. At step 824, the process may modify or initiate a new active imagination session based on the real-time physiological results so as to best enable the participant to be able to control and maintain a balance system.

At step 830, the process combines and stores the current physiological real-time results with any previous history of the participant, and generates, at step 834, a performance report for the participant to enable progress tracking, with the process terminating thereafter. Additionally, the process may be configured to be benchmarking the results of the training program against the previous results of the participant, against the previous results of other participants, and/or other perform statistically analysis on the results such as determining averages, median, peaks, lows, etc.

However, if, at step 806, the process determines that the participant's carbon dioxide level is below normal, then the process, at step 836, performs and determines the physiological measurements values of a challenge/recovery stress assessment during HRV training. At step 838, the process determine whether additional at home training is needed based on the results of the challenge/recovery stress assessment before enabling the participant to participate in an active imagination training session. If the process determines that the participant is unable at this time to perform an active imagination training session, the process at step 840 determines one or more at home training exercises that the participant should perform off-site. Examples of additional at home training may include breathing mechanics training to improve breathing behavior; stress reduction and emotional management training to improve health, stamina, and to enable a participant to maintain personal balance; and meditation designed to relax, relieve and restore your life's balance. If the process determines, based on the results of the challenge/recovery stress assessment, that the participant is able to partake in an active imagination training session, the process, at step 810, performs and determines the physiological measurements values during a capnotrainer session and continues the process as previously described above.

Figure 9:
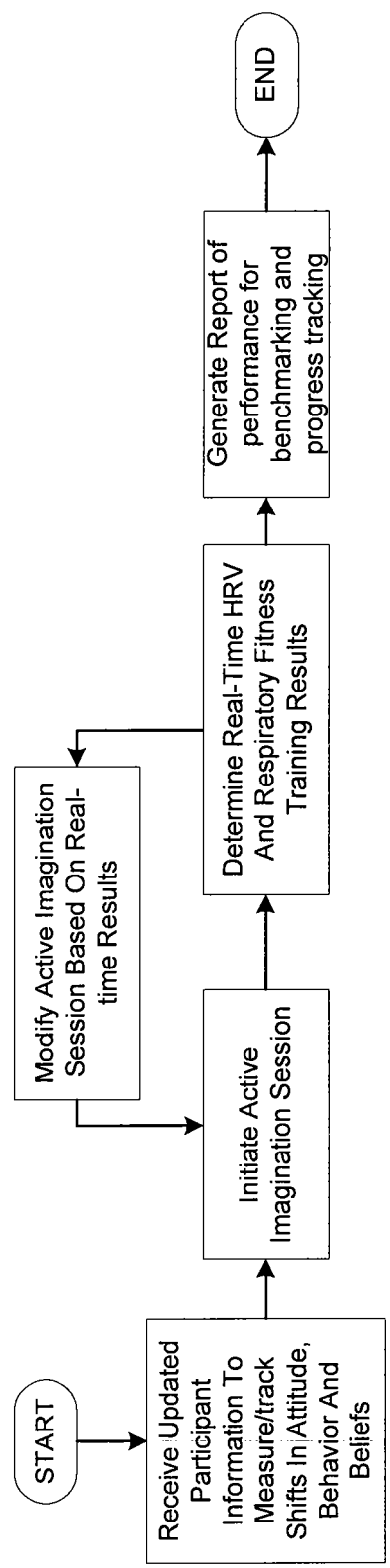
FIG. 9 illustrates a method directed towards improving creativity, memory, relaxation, and sleep in accordance with one embodiment.

All or a portion of the above method may be repeated as necessary in the same or additional training sessions to achieve a desired result. For example, FIG. 9 illustrates a process 900 specifically targeted towards improving creativity, memory, relaxation, and sleep. Process 900 begins, at step 902, by receiving, loading, and/or updating a participant's information to enable the process to measure and track shifts in physical and mental response including attitude, behavior, and beliefs. The participant information may be new information and/or may include information from any prior training sessions. At step 904, the process initiates an Active Imagination session. The process, at step 906, determines the real-time the heart rate variability (HRV) and respiratory fitness training results. At step 908, the process modifies the Active Imagination session based on the real-time results so as to best enable the participant to be able to control and maintain a relax, creative state. The process continues monitoring and updating the Active Imagination session for a predetermined time and/or until a predetermined result is achieved by the participant. At step 910, the process generates a report based on the Active Imagination session for benchmarking and progress tracking of the participant's training.

Accordingly, the disclosed embodiments provide a corporate training system and method for improving work-related performance. The above description including the hardware and software description is intended merely as an example embodiment and is not intended to limit the structure, process, or implementation of the disclosed embodiments.

Aspects of the disclosed embodiments, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming. In addition, certain aspects of the disclosed embodiments described herein may be implemented as firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

We claim:

1. A computer implemented method for selecting and altering a training session for improving work performance, the computer implemented method comprising:
   performing a breathing assessment using a capnometer to determine a breathing chemistry of a participant including a carbon dioxide level;
   selecting a training script designed to elicit a certain physiological response from the participant that affects work performance based on the breathing assessment;
   monitoring the breathing chemistry and physiological responses of the participant in real-time during the training session;
   providing alternative paths for the participant to choose from to alter the training script based on the physiological responses of the participant during the training session, wherein the alternative paths are intended to assist the participant in coping with the physiological responses; and
   altering the training script with an alternative path in response to receiving user-input indicating a participant selection of the alternative path.

2. The computer implemented method of claim 1, further comprising receiving user profile information associated with the participant.

3. The computer implemented method of claim 2, wherein selecting the training script is performed automatically based on the user profile information.

4. The computer implemented method of claim 2, further comprising:
   storing the physiological responses of the participant during the training session; and
   updating the user profile information with results of the training session.

5. The computer implemented method of claim 2, wherein the user profile information includes a learning style and an intelligence assessment associated with the participant.

6. The computer implemented method of claim 2, wherein the user profile information includes work related performance goals of the participant.

7. The computer implemented method of claim 2, wherein the training script and the alternative paths are personalized to the participant based on the user profile information.

8. The computer implemented method of claim 1, further comprising:
   determining baseline assessment values for the participant prior to initiating the training session; and
   determining post training assessment values for the participant after completion of the training session.

9. The computer implemented method of claim 1, further comprising dynamically altering the training script during the training session based on the physiological responses and breathing chemistry of the participant during the training session.

10. The computer implemented method of claim 1, further comprising dynamically altering available choices for the alternative paths presented during the training session based on the physiological responses and breathing chemistry of the participant during the training session and based on prior selection of the alternative path.

11. The computer implemented method of claim 1, wherein monitoring physiological responses of the participant during the training session includes monitoring breathing mechanics including respiratory rate and displacement, brainwave activity, and parasympathetic nervous system response.

12. The computer implemented method of claim 1, further comprising displaying to the participant, the physiological responses of the participant during the training session to enable the participant to better control the physiological responses.

13. A system for selecting and altering a training session for improving a work performance, the system comprising:
a data storage component that stores data and executable instructions;
a communication interface that receives user profile information associated with a participant;
a processor that executes the executable instructions to:
perform a breathing assessment using a capnometer to determine a breathing chemistry of the participant including a carbon dioxide level;
select a training script designed to elicit a certain physiological response from the participant that affects the work performance based on the breathing assessment;
monitor the breathing chemistry and physiological responses of the participant in real-time during the training session;
provide alternative paths for the participant to choose from to alter the training script based on the physiological responses of the participant during the training session, wherein the alternative paths are intended to assist the participant in coping with the physiological responses; and
alter the training script with an alternative path in response to receiving user-input indicating a participant selection of the alternative path.

14. The system of claim 13, wherein the processor further executes the executable instructions to automatically select the training script based on the user profile information.

15. The system of claim 13, wherein the processor further executes the executable instructions to dynamically alter the training script during the training session based on the physiological responses and breathing chemistry of the participant during the training session.

16. The system of claim 13, wherein the processor further executes the executable instructions to dynamically alter future alternative paths presented during the training session based on the physiological responses and breathing chemistry of the participant during the training session and based on prior selection of the alternative path.

17. A computer program product, comprising a non-transitory computer usable medium having a computer readable program code embodied therein, said computer readable program code is executed to:
receive user profile information associated with a participant;
perform a breathing assessment using a capnometer to determine a breathing chemistry of the participant including a carbon dioxide level;
select a training script designed to elicit a certain physiological response from the participant that affects a work performance based on the breathing assessment;
monitor the breathing chemistry and physiological responses of the participant during the training session;
provide alternative paths for the participant to choose from to alter the training script based on the physiological responses of the participant during the training session, wherein the alternative paths are intended to assist the participant in coping with the physiological responses; and
alter the training script with an alternative path in response to receiving user-input indicating a participant selection of the alternative path.

18. The computer program product of claim 17, wherein said computer readable program code is executed to dynamically alter the training script during the training session based on the physiological responses and breathing chemistry of the participant during the training session.

19. The computer program product of claim 17, wherein said computer readable program code is executed to alter future alternative paths presented during the training session based on the physiological responses and breathing chemistry of the participant during the training session and based on prior selection of the alternative path.

* * * * *